United States Patent
Perkins

(10) Patent No.: US 9,650,103 B2
(45) Date of Patent: May 16, 2017

(54) CANTILEVERED REAR STAY AND SUSPENSION FOR A SHAFT DRIVEN BICYCLE

(71) Applicant: FORD GLOBAL TECHNOLOGIES, LLC, Dearborn, MI (US)

(72) Inventor: William Paul Perkins, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/613,704

(22) Filed: Feb. 4, 2015

(65) Prior Publication Data

US 2016/0221631 A1    Aug. 4, 2016

(51) Int. Cl.
*B62K 25/28* (2006.01)
*B62M 17/00* (2006.01)

(52) U.S. Cl.
CPC ........ *B62K 25/286* (2013.01); *B62M 17/00* (2013.01); *B62K 2201/04* (2013.01)

(58) Field of Classification Search
CPC .............................. B62K 25/286; B62M 17/00
USPC ............... 280/288.3, 262, 260, 259; 180/226
See application file for complete search history.

(56) References Cited

U.S. PATENT DOCUMENTS

| 450,705 A | * | 4/1891 | Surbridge | ............ B62K 25/286 280/284 |
| 635,964 A | | 10/1899 | Horn | |
| 2,082,147 A | | 8/1935 | Bryant | |
| 2,378,634 A | * | 6/1945 | Hussey | ................. B62M 17/00 280/260 |
| 5,226,674 A | * | 7/1993 | Buell | ................... B62K 25/286 267/171 |
| 5,316,327 A | | 5/1994 | Bell | |
| 5,435,584 A | * | 7/1995 | Buell | ................... B62K 25/286 188/317 |
| 5,772,228 A | | 6/1998 | Owyang | |

(Continued)

FOREIGN PATENT DOCUMENTS

| DE | 3120552 A1 | 3/1983 |
| DE | 19945206 A1 | 4/2001 |

(Continued)

OTHER PUBLICATIONS

Search Report from related European Patent Application No. GB1601973.9, dated Jul. 8, 2016, 5 pp.

*Primary Examiner* — Tony Winner
(74) *Attorney, Agent, or Firm* — Frank MacKenzie; Brooks Kushman P.C.

(57) ABSTRACT

A bicycle having a drive-shaft connecting a crank to an internal hub gearbox on a rear wheel. The bicycle having a suspension system and a cantilevered rear stay that connects the rear wheel to the frame and maintains the hub in a relative radial distance from the crank to maintain contact of the drive-shaft with the crank and gearbox. The suspension system having a linearly moveable damping device disposed within the frame. A swing arm pivotally extends from the rear stay to the damping device. The pivotal connection of the rear stay to the frame, the linear connection of the damping device to the frame, and the pivotal connection of the swing-arm to both the rear stay and damping device provide a four-bar sliding mechanism to provide suspension for the rear wheel on the bicycle.

17 Claims, 3 Drawing Sheets

(56) References Cited

U.S. PATENT DOCUMENTS

| | | | |
|---|---|---|---|
| 6,394,477 B1* | 5/2002 | Cellini | B62M 17/00 280/260 |
| 6,446,995 B1* | 9/2002 | Xu | B62K 9/00 280/260 |
| 6,505,847 B1 | 1/2003 | Greene | |
| 7,104,562 B2 | 9/2006 | Schmider et al. | |
| 7,971,892 B2 | 7/2011 | Sasnowski et al. | |
| 2002/0121761 A1* | 9/2002 | Chang | B62M 17/00 280/260 |
| 2004/0108682 A1 | 6/2004 | Malwitz | |
| 2005/0253356 A1 | 11/2005 | Matsueda et al. | |
| 2005/0253357 A1 | 11/2005 | Chang et al. | |
| 2009/0229908 A1* | 9/2009 | Ito | B62K 19/30 180/312 |
| 2010/0194182 A1 | 8/2010 | Katz | |
| 2011/0130242 A1* | 6/2011 | Gobel | B62M 11/16 475/297 |
| 2011/0278816 A1* | 11/2011 | Chamberlain | B21C 37/29 280/281.1 |

FOREIGN PATENT DOCUMENTS

| | | |
|---|---|---|
| WO | 9915396 A1 | 4/1999 |
| WO | 03082660 A2 | 10/2003 |
| WO | 2015051472 A1 | 4/2015 |

* cited by examiner

CANTILEVERED REAR STAY AND SUSPENSION FOR A SHAFT DRIVEN BICYCLE

TECHNICAL FIELD

This disclosure relates to bicycle suspension and drive combinations, specifically to bicycles having a shaft drive, a cantilevered rear stay or fork to connect a rear wheel to a frame, and a suspension system disposed between the stay and the frame.

BACKGROUND

A bicycle, also referred to as a bike or cycle, is a vehicle which provides for a human-powered, generally pedal-driven, means to propel the vehicle. Bicycles are generally single-track vehicles, having two wheels attached to a frame, one behind the other. Bicycles generally have a power driven rear wheel and a free spinning turnable front wheel. The term bicycle generally refers to a vehicle having two (bi) circular arrangements (cycle), however, as used in this patent application the term bicycle may also be considered to extend to tricycle and quadcycle vehicles having two side-by-side power driven wheels and/or two side-by-side free spinning wheels. The term bicycle may also include vehicles that have additional wheels used to provide stability, such as stabilizer wheels, out-rigger wheels, or training wheels.

A bicycle may also include supplemental forms of propulsion, such as a motor (sometimes referred to as an electric bicycle) or engine. However a motor or engine driven vehicle similar to that of a bicycle, but without human-powered propulsion means, would be considered a motorcycle and not a bicycle. The term bicycle, as used in this patent application, does not include motorcycles or the like.

Bicycles were introduced in the 19th century in Europe and number more than a billion worldwide. Bicycles are the principal means of transportation in many regions. They also provide a popular form of recreation, and have been adapted for use in military and police applications, in courier services, as children's toys, and in racing.

Bicycles with rear suspension have become popular over the last 20 years. A rear suspension may provide for a smoother ride for both on-road and off-road riders. Rear suspension systems for bicycles are typically hung on the frame and are exposed to the environment. Suspension systems utilizing a spring-damper may fall susceptible to dirt and mud coating a piston rod and possibly damage a seal. Additionally, the motion of an exposed spring-damper may create pinch/catch points for loose clothing, shoe laces, etc. An exposed spring-damper may also be more difficult to clean and provide for an unsightly appearance.

Bicycles often utilize a chain to provide power transfer from a crank to a drive wheel. The entire chain, or at least a portion thereof, is typically exposed to the environment. Exposed bicycle chains, similar to that of exposed suspension systems, may not work as effectively if coated by mud and dirt, may provide for pinch/catch points for loose clothing, and may be difficult to clean. Additionally bicycle chains typically require oil, which may provide for a sticky surface and maintain more dirt and mud leading to additional concerns. An exposed chain may also soil a rider's pant cuffs while riding Chain guards which partially encapsulate a chain can create a bulky envelope, add weight, and cause noise when the chain contacts the chain guard.

SUMMARY

One aspect of this disclosure is directed to a bicycle having a drive-shaft disposed in a rear fork and a suspension system connecting the rear fork to a frame. The rear fork has a proximal end pivotally connected to the frame about a crank. The rear fork has a distal end connected to a hub that supports a wheel. This bicycle has a gearbox disposed within the hub. The drive-shaft is disposed in the rear fork connecting the crank to the gearbox. The suspension system damps relative movement between the rear fork (and thus the rear wheel) and the frame.

The suspension may have a spring disposed longitudinally forward of the crank and a pair of swing-arms connectably extending from the rear fork to the spring. The spring may be disposed within the frame. The suspension may include a hydraulic shock absorber disposed within the spring. A bevel crank-gear may be connected to the crank, a bevel drive-gear may be connected to the gearbox, and the drive shaft may include a pair of bevel shaft-gears on each end in mesh with the bevel crank-gear and bevel drive-gear. The gearbox may be configured to provide a number of speeds for the bicycle.

Another aspect of this disclosure is directed to a bicycle having a frame, a stay, a damping device, and a swing arm cooperating to provide a four-bar slider mechanism as suspension for a rear wheel on the bicycle. The stay is a cantilevered stay pivotally connecting the rear wheel to the frame. The damping device is a slider-style damping device slideable within the frame. The swing-arm is pivotally connected to both the stay and the damping device to provide the four-bar slider mechanism.

In this aspect, the stay may be a fork, the rear wheel may have a hub about a rear axle, and the rear axle may be supported by opposing prongs of the fork to provide rotatable connection of the rear wheel to the bicycle. A gearbox may be disposed in the hub. The gearbox may be configured to provide at least two speeds.

This bicycle has a crank supported by the frame. The cantilevered stay may be pivotally connected to the frame about the crank. The swing-arm may be connected to the cantilevered stay longitudinally rearward of the crank. The swing-arm may be connected to the damping device longitudinally forward of the crank.

This bicycle may also have a crank-gear connected to the crank, a drive-gear connected to the gearbox, and a drive-shaft connectably extending between the crank-gear and drive-gear. The crank-gear may be a bevel gear, the drive-gear may be bevel gear, and the drive-shaft may have a pair of bevel shaft-gears in meshable contact with the crank-gear and drive-gear. The cantilevered stay may then pivot about the crank and provide for a movement of the drive-gear along a substantially constant radius relative to the crank-gear as the center point.

The slider style damping device may comprise a spring having a first end mounted to the frame and a second end connected to the swing-arm. The slider-style damping device may comprise a shock absorber having a first end mounted to the frame and a second end connected to the swing-arm. The shock absorber may be disposed within the spring.

A further aspect of this disclosure is directed to a bicycle having a drive-shaft, a pivotable rear fork and a shock-absorber for the rear fork. This bicycle has a frame having a down-tube disposed between a head-tube and a hanger bracket. A crank is disposed in the hanger bracket. A steerable front fork is connected to the head-tube. The pivotable rear fork is connected about the hanger bracket. The shock-absorber is disposed within the down-tube. A pair of swing-arms pivotally connected to and extending between the rear fork and the shock-absorber. The drive-shaft connects the crank to a rear drive-gear.

The drive-shaft may be at least partially disposed in the rear fork. The shock-absorber may be a hydraulic shock surrounded by a coil spring.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
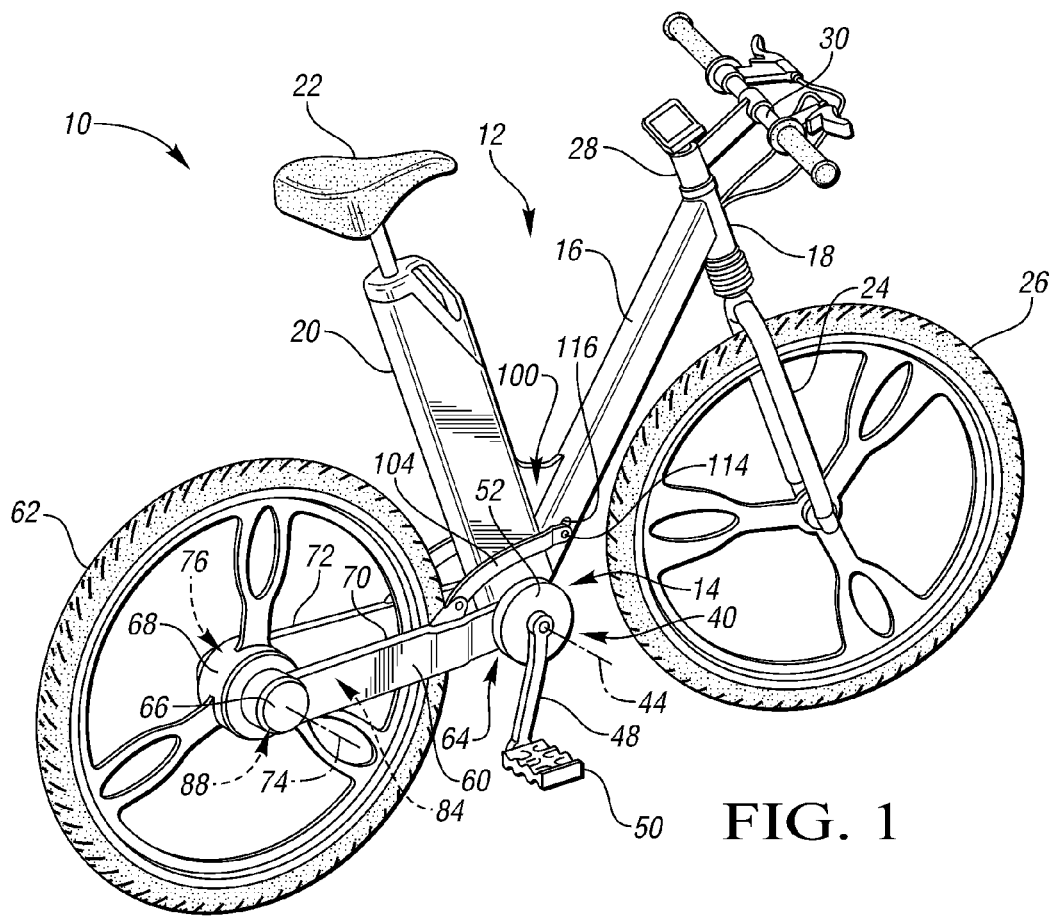
FIG. 1 is a perspective view of a bicycle having claimed aspects of the present disclosure.

FIG. 1 shows a bicycle 10 having a frame 12. The frame 12 defines a hanger bracket 14, a down-tube 16, and a head-tube 18. Frame 12 has the hanger bracket 14 connected to the down-tube 16. Frame 12 has the head-tube 18 connected to the down-tube 16. Frame 12 does not have a top-tube. Frame 12 may also have a seat stay 20 for supporting a seat 22. The seat stay 20 may be connected to the down-tube 16 proximate the hanger bracket 14, the seat stay 20 may be connected solely to the hanger bracket 14, or the seat stay may be connected to both the hanger bracket 14 and the down-tube 16.

A steerable front fork 24 may be used to support a front wheel 26. The term wheel, as used in this patent application, may include a tire, a rim, and a support structure, such as spokes or the like, to support the tire and rim. A stem 28 may connect the front fork 24 to a set of handlebars 30. The stem 28 may be partially disposed within the head-tube 18 and may have bearings sandwiched between the stem 28 and inner surface of the head-tube 18 to allow the handlebars 30 to turn the front fork 24 and front wheel 26. A front shock-absorber 32, or front suspension system 32, may also be utilized to provide damped vibration between the handlebars 30 and the front wheel 26. The front shock-absorber 32 may be disposed in-line or between the front fork 24 and the stem 28.

Figure 2:
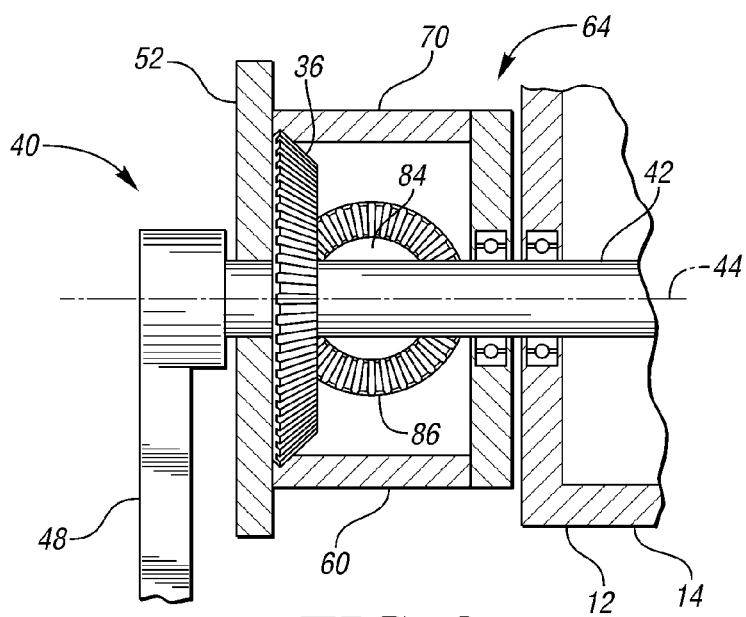
FIG. 2 is a partial sectioned view of a hanger bracket showing a pedal arm connected to a crank, a rear stay connected to the crank, a drive-shaft disposed in the rear stay, and a bevel crank-gear in mesh with a bevel shaft-gear.

FIG. 2 shows a crank 40 supported by the frame 12. Crank 40 is partially disposed in and supported by the hanger bracket 14. The crank 40 may have a crank spindle 42 defining a crank axis 44 which extends substantially transversely across the bicycle 10. The crank 40 may also have a crank-gear 46, sometimes referred to as a sprocket. Crank-gear 46 may be a bevel crank-gear 46. A pedal arm 48 is connected to the crank spindle 42 and may be considered part of the crank 40. A pedal 50 may be connected to the pedal arm 48 (see FIG. 1). A cuff protector or shield 52 may be disposed between the pedal arm 48 and the rest of the rest of the crank 40 to provide protection between clothing and the gears, and also shield the crank 40 from dirt and grime.

Referring to both FIGS. 1 and 2, a rear stay 60 may be seen. Rear stay 60 may also be referred to as a chain stay, although bicycle 10 does not have a chain. Rear stay 60 connects a rear wheel 62 to the frame 12. Rear stay 60 is pivotally connected about the hanger bracket 14. Rear stay 60 may be connected via a bearing assembly to the crank spindle 42. The rear stay 60 has a proximal end 64. The proximal end 64 may be pivotally connected to the frame 12 about the crank 40.

The rear stay 60 also has a distal end 66. The distal end may be connected to a hub 68 that supports a wheel 62. The rear stay 60 is a cantilevered rear stay 60, as the rear stay 60 does not have any seat stays extending from the distal end 66 back to the frame 12. The rear stay 60 may be a rear fork 60 having opposing right-hand and left-hand prongs 70, 72.

The hub 68 may be considered part of the wheel 62. The hub 68, however, may also be considered a separate component from the wheel 62. The hub 68 may include a rear axle 74. The rear axle 74 may be considered part of the hub 68, and as such part of the wheel 62, or may also be considered separate from the hub 68 and wheel 62. The rear stay 60 may support the rear axle 74 to provide rotatable connection of the rear wheel 62 to the bicycle 10. The rear axle 74 may span between the prongs 70, 72 at the distal end 66 of the rear fork 60 to support the hub 68 and wheel 62. The rear wheel 62 may rotate about a rear axle 74 as provided by the rear hub 68.

A gearbox 76 may be disposed in the rear hub 68. The gearbox 76 may be configured to provide a number of speeds for the bicycle 10. The gearbox 76 may be configured to provide at least two speeds for the bicycle 10. A drive-gear 78 (see FIG. 5) may be connected to the gearbox 76 about the rear axle 74. The drive-gear 78 may be bevel drive-gear 78. The drive-gear 78 may be at least partially disposed in or covered by the rear stay 60.

A drive-shaft 84 connects the crank-gear 46 to the drive-gear 78. The drive-shaft 84 may have a pair of bevel shaft-gears 86, 88 on each end. The bevel shaft-gears 86, 88 are configured to contact and mesh with the bevel crank-gear 46 and bevel drive-gear 78. The drive-shaft 84 may be at least partially disposed within the rear stay 60. The rear stay 60 pivots about the crank spindle 42, to which the crank-gear 46 is also connected and provides for movement of a drive-gear 78 along a substantially constant radius 80 from the crank-gear 46 (see FIG. 5). This allows for movement of the rear wheel 62 relative the frame 12 while maintaining contact of the drive-shaft 84 with both the crank-gear 46 and drive-gear 78.

Figure 3:
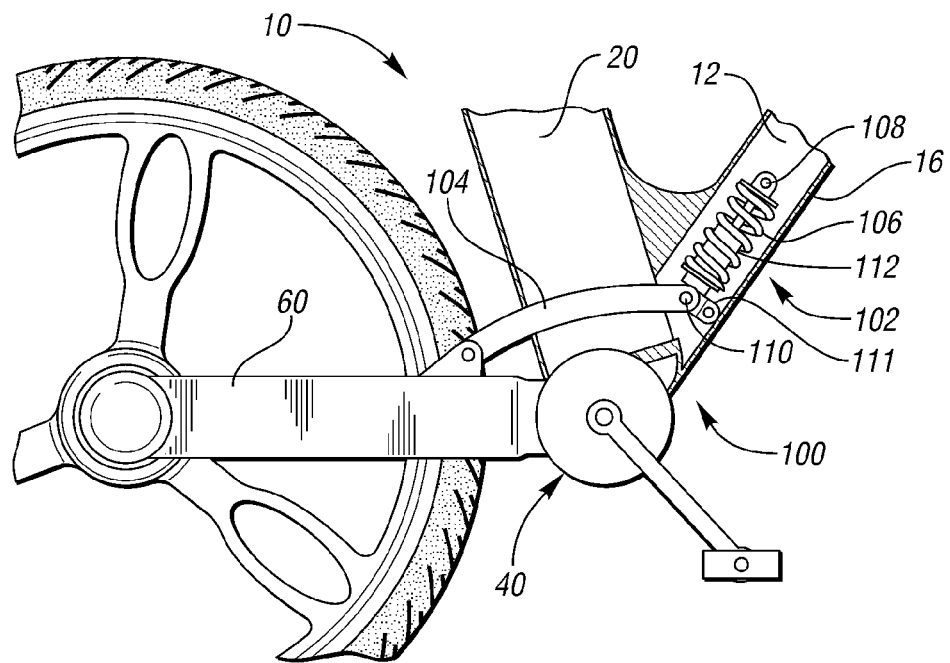
FIG. 3 is a partial side view of the bicycle of FIG. 1 with a section down-tube and an extended suspension.
Figure 4:
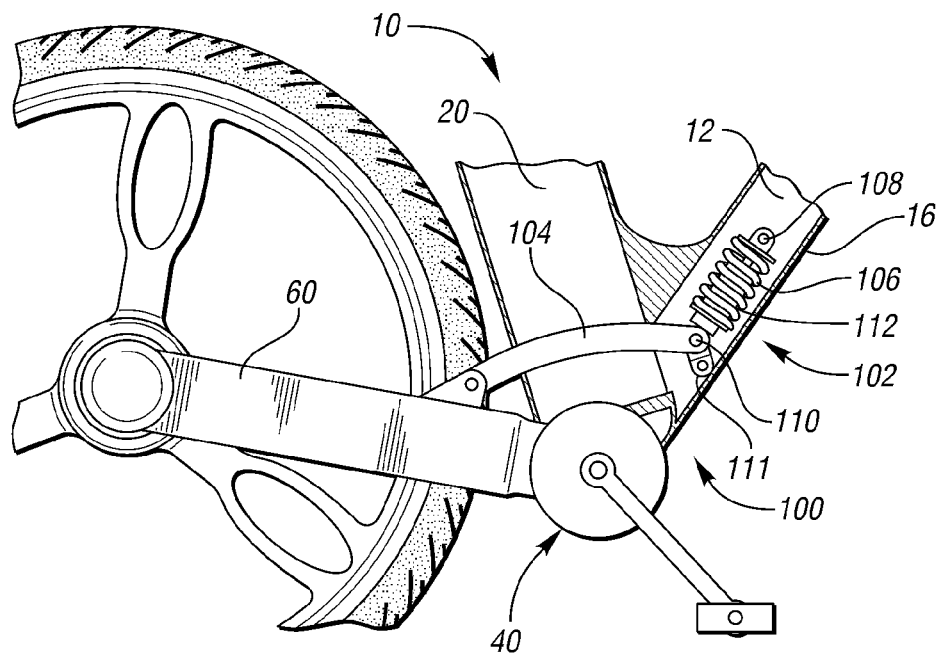
FIG. 4 is a partial side view of the bicycle of FIG. 1 with a section down-tube and a compressed suspension.
Figure 5:
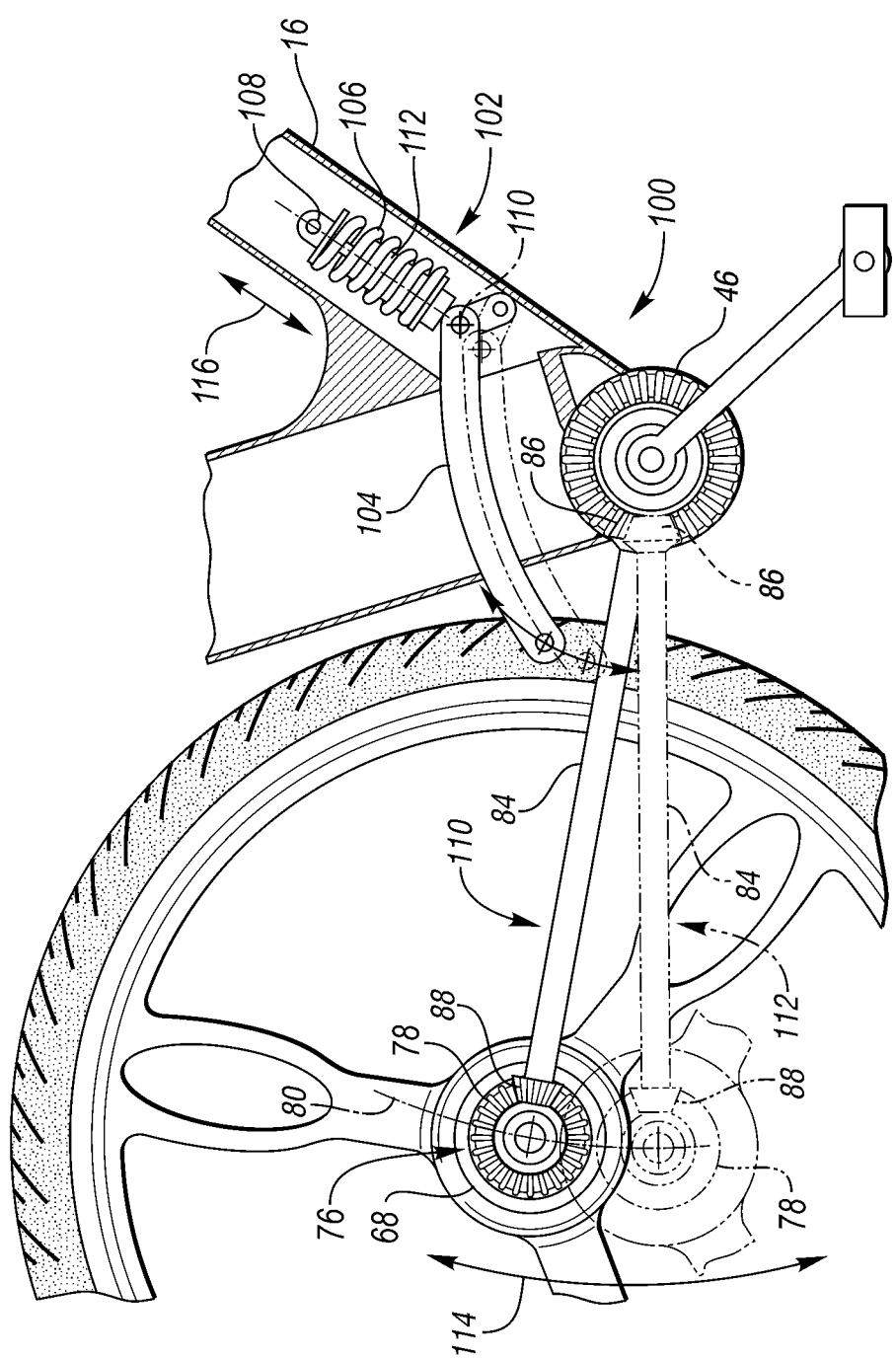
FIG. 5 is a diagrammatic illustration of a drive shaft connecting a crank-gear to a drive-gear while allowing for suspension movement.

FIGS. 3-5 showcase a suspension system 100 connected between the rear stay 60 and frame 12 to damp relative movement therebetween. The suspension system 100 has a damping device 102. The damping device 102 is a slider-style damping device 102, disposed within the frame 12. The damping device 102 may be connectedly disposed within the down-tube 16. The damping device 102 may be disposed on the bicycle 10 longitudinally forward of the crank 40.

The damping device 102 may be connected to the rear stay 60 via a swing-arm 104. In the case of the rear stay 60 being a rear fork 60, the swing-arm 104 may be a pair of swing-arms 104 each connected to one prong 70, 72 of the rear fork 60. The swing-arm is connected to the rear stay 60 longitudinally rearward of the crank 40. The swing-arm 104 is connected to the damping device 102 longitudinally forward of the crank 40. The swing-arm 104 connectably extends from the rear stay 60 to the damping device 102 over and past the crank 40.

The swing-arm 104 is pivotally connected to both the rear stay 60 and the damping device 102. The pivotal connection of the rear stay 60 to the frame 12, the slideable connection of the damping device 102 with the frame 12, and the pivotal connections of the swing-arm 104 with both the rear stay 60 and damping device 102 provide a four-bar slider mechanism on the bicycle 10 and provide suspension for the rear wheel 62 on the bicycle 10.

The damping device 102 has a spring 106. Spring 106 may be a coil spring 106. The damping device 102 may have a first end 108 mounted to the frame 12. The damping device 102 may have a second end 110 connected to the swing-arm 104. The second end 110 may also be connected to the frame 12 by a link 111. Link 111 may pivot relative to the frame 12 to allow the sliding aspect of the damping device 102, although other constraining structures may be employed.

The spring 106 may be disposed about a shock absorber 112. The shock absorber 112 may be a hydraulic shock absorber 112. The spring 106 and shock absorber 112 may be connected to the frame 12 and swing-arm 104 at the same point. A pin 114 may be used to connect the damping device 102 to the swing-arm 104 through a hole 116 defined within the frame 12 (see FIG. 1). In the case of the rear stay 60 being a fork 60, the pin 114 may extend through a pair of opposing holes 116 to a pair of swing arms 104 to provide the connection to the damping device 102.

Referring to FIG. 5, the drive-gear 78 is shown articulating along a radius 80 from an upper position 110 to a lower position 112 as indicated by arrow 114. The positioning of the drive-gear 78 is provided by the structure of the bicycle 10, as indicated above, and movement of the drive-gear 78 along a substantially constant radius from the crank 40 is controlled by the rear stay 60 (see FIGS. 3 and 4), which has been removed from this view to showcase the movement of the drive-shaft 84.

The upper position 110 corresponds to a compressed damping device 102, and thus the suspension system 100 may be referred to as being in compression. The lower position 112 corresponds to an extended damping device 102, and thus the suspension system 100 may be referred to as being extended. The damping device 102 is disposed within the down-tube 16 and the structure, as defined above, provides for a substantially linear movement of the damping device 102, as indicated by arrow 116. Full travel of the suspension system 100 is dependent upon the linear travel of the damping device 102. The damping device 102 may be tuned, dependent on frame 12 to wheel 62 clearances to provide a varying array of stiffness and travel distance. The upper and lower positions 110, 112, as shown here may not, however, be representative of topped-out or bottomed-out positions, although such positions may exist. The shaft-gears 86, 88 are in mesh with the crank-gear 46 and drive-gear 78, respectively, throughout the entire articulation of the rear wheel 62.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A bicycle comprising:
   a cantilevered stay pivotally connecting a rear wheel to a frame;
   a crank supported by the frame, wherein the cantilevered stay is pivotally connected to the frame about the crank;
   a gearbox disposed within a hub;
   a drive-shaft disposed in the cantilevered stay connecting the crank to the gearbox; and
   a suspension system connected to the cantilevered stay and frame to damp relative movement therebetween, wherein the suspension system has a spring disposed longitudinally forward of the crank within the frame and a pair of swing-arms connectably extending from the cantilevered stay to the spring.

2. The bicycle of claim 1 wherein the suspension system includes a hydraulic shock absorber disposed within the spring.

3. The bicycle of claim 1 wherein a bevel crank-gear is connected to the crank, a bevel drive-gear is connected to the gearbox, and the drive-shaft includes a pair of bevel shaft-gears on each end in mesh with the bevel crank-gear and bevel drive-gear.

4. The bicycle of claim 1 wherein the gearbox is configured to provide a number of speeds for the bicycle.

5. A bicycle comprising:
   a cantilevered stay pivotally connecting a rear wheel to a frame;
   a slider damping device slideable within the frame;
   a swing-arm pivotally connected to both the stay and the damping device to provide a four-bar slider mechanism with the stay and damping device and provide suspension for the rear wheel on the bicycle; and
   a crank supported by the frame, wherein the stay is pivotally connected to the frame about the crank.

6. The bicycle of claim 5 wherein the cantilevered stay is a fork, the bicycle further comprises a hub about a rear axle supported by opposing prongs of the fork to provide rotatable connection of the rear wheel to the bicycle.

7. The bicycle of claim 6 further comprising a gearbox disposed in the hub.

8. The bicycle of claim 7 wherein the gearbox is configured to provide at least two speeds.

9. The bicycle of claim 5 wherein the swing-arm is connected to the cantilevered stay longitudinally rearward of the crank and the swing-arm is connected to the slider damping device longitudinally forward of the crank.

10. The bicycle of claim 5 further comprising:
    a crank-gear connected to the crank;
    a drive-gear connected to a gearbox disposed in a hub of the rear wheel; and
    a drive-shaft connectably extending between the crank-gear and drive-gear.

11. The bicycle of claim 10 wherein the crank-gear is a bevel crank-gear, the drive-gear is a bevel drive-gear, and the drive-shaft has a pair of bevel shaft-gears in meshable contact with the crank-gear and drive-gear.

12. The bicycle of claim 10 wherein the cantilevered stay pivots about the crank and provides for movement of the drive-gear along a substantially constant radius from the crank-gear.

13. The bicycle of claim 5 wherein the slider damping device comprises a spring having a first end mounted to the frame and a second end connected to the swing-arm.

14. The bicycle of claim 5 wherein the slider damping device comprises a shock absorber having a first end mounted to the frame and a second end connected to the swing-arm.

15. A bicycle comprising:
   a frame having a down-tube disposed between a head-tube and a hanger bracket;
   a crank disposed in the hanger bracket;
   a steerable front fork connected to the head-tube;
   a pivotable rear fork connected about the hanger bracket;
   a shock-absorber disposed within the down-tube;
   a pair of swing-arms pivotally connected to and extending between the rear fork and the shock-absorber; and
   a drive-shaft connecting the crank to a rear drive-gear.

16. The bicycle of claim 15 wherein the shock-absorber has a hydraulic shock surrounded by a coil spring.

17. The bicycle of claim 15 wherein the drive-shaft is at least partially disposed in the rear fork.

\* \* \* \* \*